US008409325B2

(12) United States Patent
Yoshinaga et al.

(10) Patent No.: US 8,409,325 B2
(45) Date of Patent: Apr. 2, 2013

(54) ASYMMETRIC GAS SEPARATION MEMBRANE AND PROCESS FOR GAS SEPARATION

(75) Inventors: Toshimune Yoshinaga, Ichihara (JP); Makoto Nakamura, Ichihara (JP); Tomonori Kanougi, Ichihara (JP); Yoji Kase, Ichihara (JP); Kenji Fukunaga, Ichihara (JP)

(73) Assignee: Ube Industries, Ltd., Ube-shi (JP)

( * ) Notice: Subject to any disclaimer, the term of this patent is extended or adjusted under 35 U.S.C. 154(b) by 176 days.

(21) Appl. No.: 13/121,840

(22) PCT Filed: Sep. 30, 2009

(86) PCT No.: PCT/JP2009/067097
§ 371 (c)(1),
(2), (4) Date: Apr. 25, 2011

(87) PCT Pub. No.: WO2010/038810
PCT Pub. Date: Apr. 8, 2010

(65) Prior Publication Data
US 2011/0232484 A1 Sep. 29, 2011

(30) Foreign Application Priority Data

Sep. 30, 2008 (JP) ................................. 2008-254483

(51) Int. Cl.
*B01D 53/22* (2006.01)

(52) U.S. Cl. ................. 95/47; 95/43; 95/45; 96/4; 96/8; 96/10

(58) Field of Classification Search ................ 95/43, 45, 95/47; 96/4, 8, 10
See application file for complete search history.

(56) References Cited

U.S. PATENT DOCUMENTS

| | | | | | |
|---|---|---|---|---|---|
| 3,853,754 | A | * | 12/1974 | Gosser | 502/152 |
| 4,307,135 | A | * | 12/1981 | Fox | 427/244 |
| 4,959,151 | A | * | 9/1990 | Nakatani et al. | 210/640 |
| 5,078,755 | A | * | 1/1992 | Tozawa et al. | 95/46 |
| 5,133,867 | A | * | 7/1992 | LaFreniere | 210/651 |
| 5,246,743 | A | * | 9/1993 | Kusuki et al. | 427/569 |
| 6,180,008 | B1 | * | 1/2001 | White | 210/500.39 |
| 8,241,501 | B2 | * | 8/2012 | Liu et al. | 210/640 |
| 2004/0045432 | A1 | * | 3/2004 | Yamamoto et al. | 95/48 |
| 2008/0017029 | A1 | * | 1/2008 | Kase et al. | 95/50 |

FOREIGN PATENT DOCUMENTS

| | | |
|---|---|---|
| EP | 0446947 A2 | 9/1991 |
| JP | A-S61-133106 | 6/1986 |
| JP | A-H02-251232 | 10/1990 |
| JP | A-H03-267130 | 11/1991 |
| JP | A-H04-16213 | 1/1992 |
| JP | A-H06-254367 | 9/1994 |
| JP | A-2004-267810 | 9/2004 |

OTHER PUBLICATIONS

International Search Report issued in corresponding PCT Application No. PCT/JP2009/067097, mailed Dec. 1, 2009.
International Preliminary Report on Patentability and Written Opinion in corresponding PCT Application No. PCT/JP2009/067097, mailed May 19, 2011.

* cited by examiner

*Primary Examiner* — Jason M Greene
*Assistant Examiner* — Anthony Shumate
(74) *Attorney, Agent, or Firm* — Knobbe Martens Olson & Bear LLP

(57) ABSTRACT

There is disclosed an asymmetric gas separation membrane exhibiting both improved gas separation performance and improved mechanical properties, which is made of a soluble aromatic polyimide comprised of a repeating unit represented by general formula (1):

general formula (1)

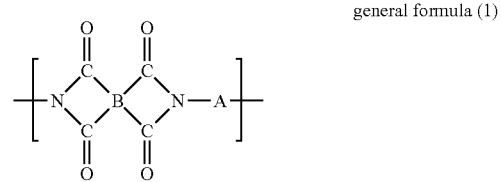

wherein B in general formula (1) B comprises 10 to 70 mol % of tetravalent unit B1 represented by general formula (B1) and 90 to 30 mol % of tetravalent unit B2 represented by general formula (B2), and A in general formula (1) comprises 10 to 50 mol % of bivalent unit A1 represented by general formula (A1a) or the like and 90 to 30 mol % of bivalent unit A2 represented by general formula (A2a) or the like.

(B1)

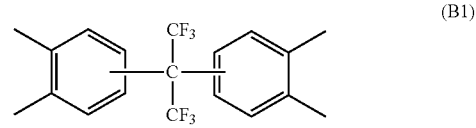

(B2)

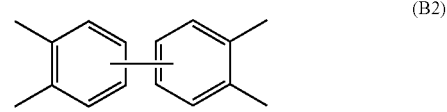

(A1a)

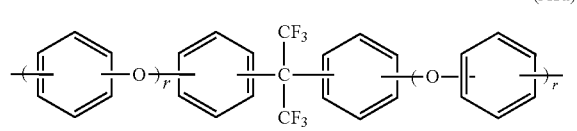

(A2a)

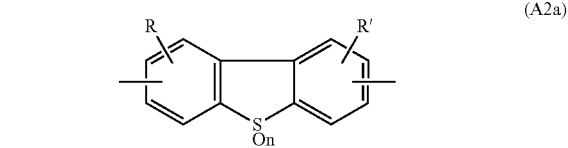

11 Claims, No Drawings

ASYMMETRIC GAS SEPARATION MEMBRANE AND PROCESS FOR GAS SEPARATION

This application is the U.S. National Phase under 35 U.S.C. §371 of International Application No. PCT/JP2009/067097, filed Sep. 30, 2009, designating the U.S., and published in Japanese as WO2010/038810 on Apr. 8, 2010, which claims priority to Japanese Patent Application No. 2008-254483, filed Sep. 30, 2008, the entire contents of which are incorporated herein by reference.

TECHNICAL FIELD

The present invention relates to an asymmetric gas separation membrane made of a soluble aromatic polyimide comprising particular repeating units exhibiting both excellent gas separation performance and improved mechanical properties, and a process for gas separation using the asymmetric gas separation membrane.

BACKGROUND ART

Patent Document 1 discloses a process for manufacturing a gas separation membrane using a soluble aromatic polyimide prepared from a tetracarboxylic acid component containing biphenyltetracarboxylic acid as a main ingredient and a diamine having an intramolecular sulfone group. However, Patent Document 1 does not describe that as a tetracarboxylic acid component, biphenyltetracarboxylic acid is combined with 4,4'-(hexafluoroisopropylidene)diphthalic acid. Furthermore, the document does not describe that diaminodiphenylene sulfones, which are synonymous with a diaminodibenzothiophene=5,5-dioxides described later, and a bis(aminophenoxyphenyl)hexafluoropropanes are combined to give a gas separation membrane exhibiting excellent gas separation performance.

Patent Document 2 discloses a process for manufacturing a two-layer gas separation membrane employing, as a separation membrane, a soluble aromatic polyimide prepared from a tetracarboxylic acid component containing biphenyltetracarboxylic acid as a main ingredient and a diamine component consisting of a diamine having an intramolecular $—SO_2—$ group and a diamine having an intramolecular $—C(CF_3)_2—$ group. Patent Document 2, however, describes neither that as a tetracarboxylic acid component, biphenyltetracarboxylic acid is combined with 4,4'-(hexafluoroisopropylidene)diphthalic acid nor that an asymmetric gas separation membrane has a uniform composition.

Patent Document 3 discloses a hollow fiber gas separation membrane made of an aromatic polyimide prepared from a tetracarboxylic acid component consisting of 4,4'-(hexafluoroisopropylidene)diphthalic acid and biphenyltetracarboxylic acid and a diamine component containing a diaminodiphenylene sulfones, which are synonymous with diaminodibenzothiophene=5,5-dioxide described later, as a main ingredient. This hollow fiber gas separation membrane has good gas separation performance such as an improved ratio of a permeation rate of oxygen gas to that of nitrogen gas (i.e. permselectivity), but there is a need for improvement in its mechanical properties as a hollow fiber membrane. Patent Document 3 describes that it is preferable to use an aromatic diamine compound having two or more benzene rings in combination with a diamine such as a diaminodiphenylene sulfone. The document does, however, not specifically describe further improvement in gas separation performance using in combination with bis(aminophenoxyphenyl)hexafluoropropanes.

CITATION LIST

Patent Documents

Patent Document 1: Japanese Laid-open patent publication No. 1986-133106.
Patent Document 2: Japanese Laid-open patent publication No. 1990-251232.
Patent Document 3: Japanese Laid-open patent publication No. 1991-267130.

SUMMARY OF INVENTION

Problem to be Solved by the Invention

An objective of the present invention is to provide an asymmetric gas separation membrane made of a soluble aromatic polyimide comprising particular repeating units exhibiting both improved gas separation performance and improved mechanical properties, and a process for gas separation using the asymmetric gas separation membrane. An asymmetric gas separation membrane of the present invention is improved in both gas separation performance between oxygen gas and nitrogen gas and mechanical properties, and can be, therefore, suitably used to provide nitrogen-rich air with a higher nitrogen concentration or oxygen-rich air with a higher oxygen concentration from the air.

Means For Solving Problem

The present invention relates to the following items.

1. An asymmetric gas separation membrane made of a soluble aromatic polyimide comprising a repeating unit represented by general formula (1):

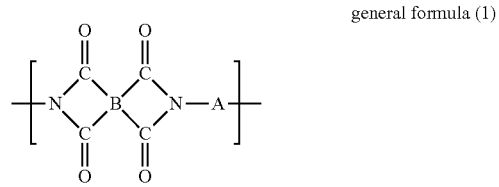

general formula (1)

wherein,

B in general formula (1) comprises 10 to 70 mol % of tetravalent unit B1 having a diphenylhexafluoropropane structure represented by general formula (B1), and 90 to 30 mol % of tetravalent unit B2 having a biphenyl structure represented by general formula (B2); and A in general formula (1) comprises 10 to 50 mol % of bivalent unit A1 having a hexafluorinated structure selected from the group consisting of a unit represented by general formula (A1a) and a unit represented by (A1b), and 90 to 30 mol % of bivalent unit A2 having a sulfur-containing heterocyclic structure selected from the group consisting of a bivalent unit represented by general formula (A2a) and a bivalent unit represented by general formula (A2b);

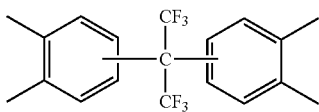
(B1)

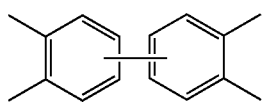
(B2)

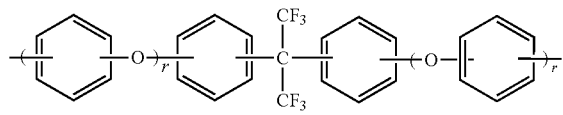
(A1a)

wherein r is 0 or 1 and a phenyl ring is optionally substituted with an OH group;

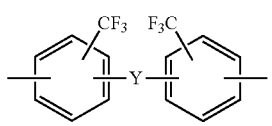
(A1b)

wherein Y represents O or single bond;

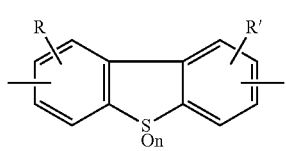
(A2a)

wherein R and R' are hydrogen or an organic group and n is 0, 1 or 2;

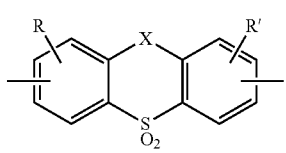
(A2b)

wherein R and R' are hydrogen or an organic group, and X is —CH$_2$— or —CO—.

2. The asymmetric gas separation membrane according to the above item 1, wherein said unit A1 is a bivalent unit derived from a compound selected from 2,2-bis[4-(4-aminophenoxy)phenyl]hexafluoropropane, 2,2-bis(4-aminophenyl)hexafluoropropane, 2,2-bis(3-amino-4-hydroxy)hexafluoropropane, 2,2'-bis(trifluoromethyl)-4,4'-diaminobiphenyl, 2,2'-bis(trifluoromethyl)-4,4'-diaminodiphenyl ether and a combination thereof by removing an amino group.

3. The asymmetric gas separation membrane according to the above item 1 or 2, wherein said unit A2 is a bivalent unit derived from 3,7-diamino-dimethyldibenzothiophene=5,5-dioxide by removing an amino group.

4. The asymmetric gas separation membrane according to any one of the above items 1 to 3, wherein said A in general formula (1) comprises a bivalent unit A3 derived from a diamine component other than said unit A1 or A2 in an amount of 50 mol % or less.

5. The asymmetric gas separation membrane according to any one of the above items 1 to 4, wherein the membrane is an asymmetric nonporous membrane.

6. The asymmetric gas separation membrane according to any one of the above items 1 to 5, wherein the membrane is a hollow fiber membrane.

7. The asymmetric gas separation membrane according to any one of the above items 1 to 6, wherein a solvent in an aromatic polyimide solution during membrane formation is an amide solvent.

8. The asymmetric gas separation membrane according to the above item 7, wherein a coagulation liquid into which an aromatic polyimide solution is extruded during membrane formation is selected from the group consisting of water, an aqueous solution of an amide solvent and an aqueous solution of ethanol.

9. The asymmetric gas separation membrane according to any one of the above items 1 to 8, exhibiting gas separation performance in which a permeation rate of an oxygen gas ($P'_{O2}$) is $6.0 \times 10^{-5}$ cm$^3$ (STP)/cm$^2$·sec·cm Hg or more and a ratio of a permeation rate of an oxygen gas to that of a nitrogen gas ($P'_{O2}/P'_{N2}$) is 4.0 or more.

10. The asymmetric gas separation membrane according to any one of the above items 1 to 9, wherein a tensile elongation at break is 10% or more.

11. A process for selectively separating and recovering a particular gas from a mixed gas containing two or more gases, using the asymmetric gas separation membrane according to any one of the above items 1 to 10.

12. A process for producing an oxygen-rich air or nitrogen-rich air from an air, using the asymmetric gas separation membrane according to any one of the above items 1 to 10.

Effect of the Invention

The present invention can provide an asymmetric hollow fiber gas separation membrane exhibiting improved gas separation performance such as separation between oxygen and nitrogen gases. Furthermore, an asymmetric gas separation membrane of the present invention exhibits improved gas separation performance between oxygen and nitrogen gases, so that it can be suitably used for obtaining nitrogen-rich air with a higher nitrogen concentration or oxygen-rich air with a higher oxygen concentration from the air. Furthermore, in the present invention, since a separation membrane having excellent performance can be obtained from a solution of a polyimide using an amide solvent, a manufacturing process for an asymmetric membrane can be conducted using an aqueous solvent as a coagulation liquid, which results in simplifying a process facility.

DESCRIPTION OF EMBODIMENTS

The present invention relates to an asymmetric gas separation membrane which is made of a soluble aromatic polyimide comprising a particular repeating unit and has an asymmetric structure consisting of an extremely thin dense layer (preferably having a thickness of 0.001 to 5 μm) which is mainly responsible for gas separation performance and a relatively thicker porous layer (preferably having a thickness of 10 to 2000 μm) supporting the dense layer. The asymmetric gas separation membrane exhibits improved gas separation performance. Preferably, it is a hollow fiber membrane having an inner diameter of 10 to 3000 μm and an outer diameter of about 30 to 7000 μm.

An aromatic polyimide constituting an asymmetric gas separation membrane of the present invention has a repeating unit represented by general formula (1).

In this formula, B is a tetravalent unit derived from a tetracarboxylic acid component, which contains units B1 and B2 as essential elements. A is a bivalent unit derived from a diamine component, which contains units A1 and A2 as essential elements as described below. An aromatic polyimide constituting an asymmetric gas separation membrane of the present invention, therefore, contains units B1, B2, A1 and A2 as essential constitutional units. The units constituting the aromatic polyimide will be detailed below.

Unit B is a tetravalent unit derived from a tetracarboxylic acid component, which contains 10 to 70 mol %, preferably 20 to 60 mol % of unit B1 having a diphenylhexafluoropropane structure represented by general formula (B1) and 90 to 30 mol %, preferably 80 to 40 mol % of unit B2 having a biphenyl structure represented by general formula (B2), and it preferably substantially consists of unit B1 and unit B2. If the diphenylhexafluoropropane structure is less than 10 mol % and the biphenyl structure is more than 90 mol %, gas separation performance of a polyimide obtained is to be lowered and high performance gas separation membrane cannot be obtained. If the diphenylhexafluoropropane structure is more than 70 mol % and the biphenyl structure is less than 30 mol %, mechanical strength of a polyimide obtained may be lowered.

Unit A is a bivalent unit derived from a diamine component, which contains 10 to 50 mol %, preferably 20 to 40 mol % of bivalent unit A1 having a hexafluorinated structure and 90 to 30 mol %, preferably 90 to 40 mol %, more preferably 90 to 50 mol %, further preferably 80 to 60 mol % of bivalent unit A2 having a sulfur-containing heterocyclic structure. If bivalent unit A1 having a hexafluorinated structure is less than 10 mol % or more than 50 mol %, gas separation performance cannot be improved. Furthermore, unit A can contain bivalent unit A3 derived from diamine components other than A1 and A2 in an amount of 50 mol % or less (that is, 0 to 50 mol %).

Unit A1 has a hexafluorinated structure, more specifically a structure having two trifluoromethyl groups, selected from the group consisting of units represented by general formula (A1a) and those represented by general formula (A1b).

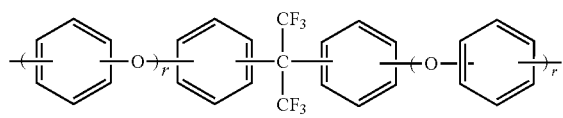
(A1a)

wherein r is 0 or 1, and the phenyl rings can have an OH group as a substituent.

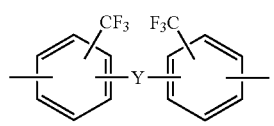
(A1b)

wherein, Y represents O or a single bond.

Unit A2 is a sulfur-containing heterocyclic structure, specifically selected from the group consisting of units represented by general formula (A2a) and those represented by general formula (A2b).

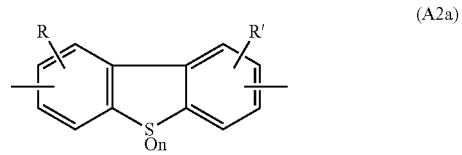
(A2a)

wherein R and R' are hydrogen or an organic group, and n is 0, 1 or 2.

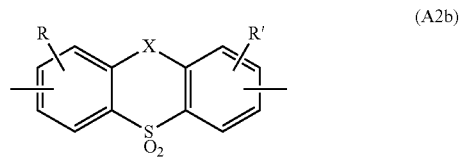
(A2b)

wherein R and R' are hydrogen or an organic group, and X is —$CH_2$— or —CO—.

There will be described monomers constituting each unit in the aromatic polyimide.

The unit having the diphenylhexafluoropropane structure represented by general formula (B1) can be prepared using a (hexafluoroisopropylidene)diphthalic acid, its dianhydride or its ester as a tetracarboxylic acid component. The (hexafluoroisopropylidene)diphthalic acids may be suitably selected from 4,4'-(hexafluoroisopropylidene)diphthalic acid, 3,3'-(hexafluoroisopropylidene)diphthalic acid, 3,4'-(hexafluoroisopropylidene)diphthalic acid, their dianhydrides and their esters, particularly suitably 4,4'-(hexafluoroisopropylidene)diphthalic acid, its dianhydride and its ester.

The unit having the biphenyl structure represented by general formula (B2) can be prepared by using a biphenyltetracarboxylic acids such as biphenyltetracarboxylic acid, its dianhydride or its ester as a tetracarboxylic acid component. The biphenyltetracarboxylic acids may be suitably selected from 3,3',4,4'-biphenyltetracarboxylic acid, 2,3,3',4'-biphenyltetracarboxylic acid, 2,2',3,3'-biphenyltetracarboxylic acid, their dianhydrides and their esters, particularly suitably 3,3',4,4'-biphenyltetracarboxylic acid, its dianhydride or its ester.

The bivalent unit represented by general formula (A1a) can be prepared by using a hexafluorinated compound represented by general formula (A1a-M) as a diamine component.

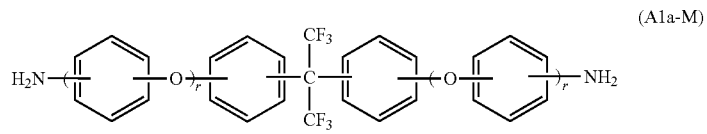
(A1a-M)

wherein r is 0 or 1, and each phenyl may have an OH group as a substituent.

A preferable hexafluorinated compound represented by (A1a-M) is represented by any of general formulas (A1a-M1) to (A1a-M3).

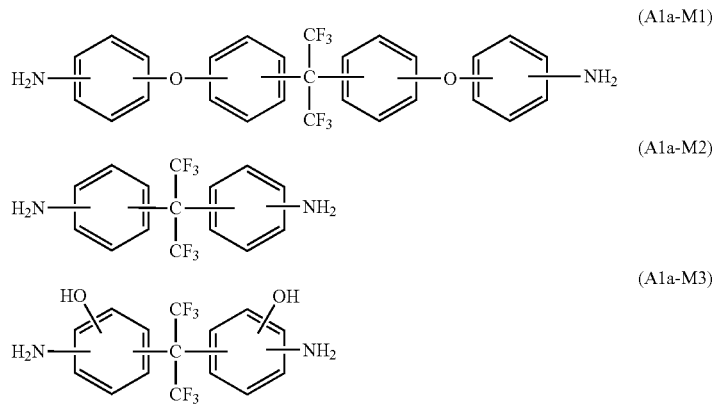

(A1a-M1)

(A1a-M2)

(A1a-M3)

The bis[(aminophenoxy)phenyl]hexafluoropropanes represented by general formula (A1a-M1) can include, for example, 2,2-bis[4-(4-aminophenoxy)phenyl]hexafluoropropane and 2,2-bis[4-(3-aminophenoxy)phenyl]hexafluoropropane. The bis(aminophenyl)hexafluoropropane represented by general formula (A1a-M2) can include, for example, 2,2-bis(4-aminophenyl)hexafluoropropane. The hydroxylated bis(aminophenyl)hexafluoropropanes represented by general formula (A1a-M3) can include, for example, 2,2-bis(3-amino-4-hydroxy)hexafluoropropane.

The bivalent unit represented by general formula (A1b) is obtained by using a hexafluorinated compound represented by general formula (A1b-M) as a diamine component.

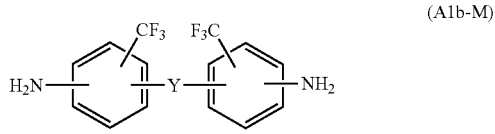

(A1b-M)

wherein Y represents O or a single bond.

The diamine compound represented by general formula (A1b-M) can include, for example, 2,2'-bis(trifluoromethyl)-4,4'-diaminodiphenyl ether and 2,2'-bis(trifluoromethyl)-4,4'-diaminobiphenyl.

The unit having a structure represented by general formula (A2a) and (A2b) are obtained by using an aromatic diamine represented by general formula (A2a-M) and (A2b-M), respectively, as a diamine component.

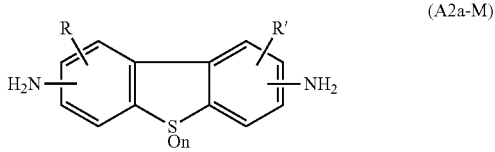

(A2a-M)

wherein each R or R' is hydrogen or an organic group, and n is 0, 1 or 2.

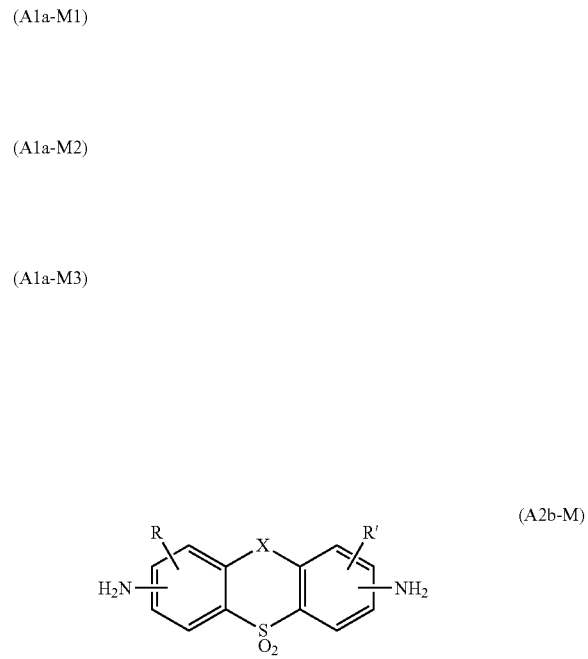

(A2b-M)

wherein each R or R' is hydrogen atom or an organic group, and X is —CH$_2$— or —CO—.

The aromatic diamine represented by general formula (A2a-M) can include, preferably, the diaminodibenzothiophene represented by general formula (A2a-M1), that is, general formula (A2a-M) in which n is 0, or the diaminodibenzothiophene=5,5-dioxide represented by general formula (A2a-M2), that is, general formula (A2a-M) in which n is 2.

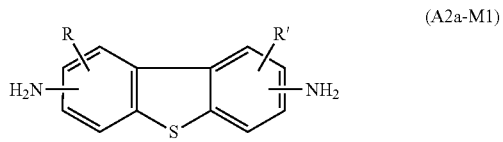

(A2a-M1)

wherein each R or R' is hydrogen atom or an organic group.

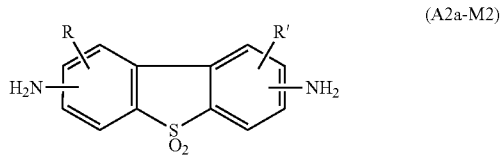

(A2a-M2)

wherein each R or R' is hydrogen atom or an organic group.

The diaminodibenzothiophenes (general formula (A2a-M1)) may include, for example, 3,7-diamino-2,8-dimethyldibenzothiophene, 3,7-diamino-2,6-dimethyldibenzothiophene, 3,7-diamino-4,6-dimethyldibenzothiophene, 2,8-diamino-3,7-dimethyldibenzothiophene, 3,7-diamino-2,8-diethyldibenzothiophene, 3,7-diamino-2,6-diethyldibenzothiophene, 3,7-diamino-4,6-diethyldibenzothiophene, 3,7- diamino-2,8-dipropyldibenzothiophene, 3,7-diamino-2,6-dipropyldibenzothiophene, 3,7-diamino-4,6-dipropyldibenzothiophene, 3,7-diamino-2,8-dimethoxydibenzothiophene, 3,7-diamino-2,6-dimethoxydibenzothiophene, and 3,7-diamino-4,6-dimethoxydibenzothiophene.

The diaminodibenzothiophene=5,5-dioxides (general formula (A2a-M2)) may include, for example, 3,7-diamino-2,8-dimethyldibenzothiophene=5,5-dioxide, 3,7-diamino-2,6-dimethyldibenzothiophene=5,5-dioxide, 3,7-diamino-4,6-dimethyldibenzothiophene=5,5-dioxide, 2,8-diamino-3,7-dimethyldibenzothiophene=5,5-dioxide, 3,7-diamino-2,8-diethyldibenzothiophene=5,5-dioxide, 3,7-diamino-2,6-diethyldibenzothiophene=5,5-dioxide, 3,7-diamino-4,6-diethyldibenzothiophene=5,5-dioxide, 3,7-diamino-2,8-dipropyldibenzothiophene=5,5-dioxide, 3,7-diamino-2,6-dipropyldibenzothiophene=5,5-dioxide, 3,7-diamino-4,6-dipropyldibenzothiophene=5,5-dioxide, 3,7-diamino-2,8-dimethoxydibenzothiophene=5,5-dioxide, 3,7-diamino-2,6-dimethoxydibenzothiophene=5,5-dioxide, and 3,7-diamino-4,6-dimethoxydibenzothiophene=5,5-dioxide.

The diaminothioxanthene-10,10-diones that are given by selecting —$CH_2$— as X in the general formula (A2b-M) may include, for example, 3,6-diaminothioxanthene-10,10-dione, 2,7-diaminothioxanthene-10,10-dione, 3,6-diamino-2,7-diamethylthioxanthene-10,10-dione, 3,6-diamino-2,8-diethylthioxanthene-10,10-dione, 3,6-diamino-2,8-dipropylthioxanthene-10,10-dione, and 3,6-diamino-2,8-dimethoxythioxanthene-10,10-dione.

The diaminothioxanthene-9,10,10-triones that are given by selecting —CO— as X in the general formula (A2b-M) may include, for example, 3,6-diamino-thioxanthene-9,10,10-trione and 2,7-diamino-thioxanthene-9,10,10-trione.

In the diamine component in the aromatic polyimide constituting the asymmetric gas separation membrane of the present invention, particularly preferred is a combination of a diaminodibenzothiophene=5,5-dioxide, particularly 3,7-diamino-dimethyldibenzothiophene=5,5-dioxide, as a diamine providing bivalent unit A2, and a diamine compound selected from the group consisting of 2,2-bis[4-(4-aminophenoxy)phenyl]hexafluoropropane, 2,2-bis(4-aminophenyl)hexafluoropropane, 2,2-bis(3-amino-4-hydroxy)hexafluoropropane, 2,2'-bis(trifluoromethyl)-4,4'-diaminobiphenyl, 2,2'-bis(trifluoromethyl)-4,4'-diaminodiphenyl ether and a combination of these compounds, as a diamine providing bivalent unit A1. Here, 3,7-diamino-dimethyldibenzothiophene=5,5-dioxide means any of isomers different in a position of a methyl group or a mixture of the isomers. Generally, preferred is a mixture comprising 3,7-diamino-2,8-dimethyldibenzothiophene=5,5-dioxide, 3,7-diamino-2,6-dimethyldibenzothiophene=5,5-dioxide, 3,7-diamino-4,6-dimethyldibenzothiophene=5,5-dioxide.

The other diamine component providing unit A3 is a diamine compound other than those represented by formula (A1a-M), formula (A1b-M), formula (A1a-M) and formula (A2b-M), and there is selected a compound which does not lower the effects of the present invention, or, in some cases, which can improve performance further.

Examples can include
diaminodiphenyl sulfones such as 3,3'-diaminodiphenyl sulfone, 3,4'-diaminodiphenyl sulfone, 4,4'-diaminodiphenyl sulfone and 4,4'-diamino-3,3'-dimethyldiphenyl sulfone;
diaminodiphenyl ethers such as 4,4'-diaminodiphenyl ether, 3,4'-diaminodiphenyl ether, 3,3'-diaminodiphenyl ether, 3,3'-dimethyl-4,4'-diaminodiphenyl ether and 3,3'-diethoxy-4,4'-diaminodiphenyl ether;
diaminodiphenylmethanes such as 4,4'-diaminodiphenylmethane and 3,3'-diaminodiphenylmethane;
2,2-bis(aminophenyl)propanes such as 2,2-bis(3-aminophenyl)propane and 2,2-bis(4-aminophenyl)propane;
2,2-bis(aminophenoxyphenyl)propanes such as 2,2-bis[4-(4-aminophenoxy)phenyl]propane and 2,2-bis[4-(3-aminophenoxy)phenyl]propane;
diaminobenzophenones such as 4,4'-diaminobenzophenone and 3,3'-diaminobenzophenone;
diaminobenzoic acids such as 3,5'-diaminobenzoic acid;
phenylenediamines such as 1,3-phenylenediamine and 1,4-phenylenediamine;
dichlorodiaminodiphenyl ethers such as 2,2'-dichloro-4,4'-diaminodiphenyl ether;
tolidines such as orthotolidine and metatolidine;
dihydroxydiaminobiphenyls such as 2,2'-dihydroxy-4,4'-diaminobiphenyl; and
diaminotetrachlorobiphenyls such as 4,4'-diamino-2,2',5,5'-tetrachlorobiphenyl.

Among these, preferred are diaminodiphenyl sulfones, diaminodiphenyl ethers, diaminobenzoic acids, dichlorodiaminodiphenyl ethers and dihydroxydiaminobiphenyls.

The diamine compound providing unit A3 can be used in an amount of 50 mol % or less in the diamine component as described before. It is used preferably in 40 mol % or less, more preferably 20 mol % or less. The diaminodiphenyl ethers such as 4,4'-diaminodiphenyl ether can be used in a relatively higher amount, specifically it can be suitably used in an amount of 50 mol % or less, preferably 45 mol % or less.

In the aromatic polyimide constituting the asymmetric gas separation membrane of the present invention, the tetracarboxylic acid component can contain a monomer element other than those corresponding to unit B1 and unit B2 in a small amount (generally 20 mol % or less, particularly 10 mol % or less) as long as the effects of the present invention can be retained, although it is also preferable not to use the additional tetracarboxylic acid compound.

The aromatic polyimide constituting the asymmetric gas separation membrane of the present invention is highly soluble in an organic polar solvent, and the tetracarboxylic acid component and the diamine component can be easily polymerized and imidized in an organic polar solvent in a substantially equal molar amount, to give an aromatic polyimide solution with a high polymerization degree. Thus, an asymmetric hollow fiber membrane can be obtained advantageously from this aromatic polyimide solution by dry-wet spinning method.

The aromatic polyimide solution can be preferably prepared by a two-step process of mixing a tetracarboxylic acid component and a diamine component in an organic polar solvent in a predetermined composition ratio, which is then polymerized at a low temperature of around room temperature to give a polyamide acid, and then imidizing the polyamide acid by heating or chemically imidizing by adding, for example, pyridine. Alternatively, the aromatic polyimide solution can be preferably prepared by a one-step process of mixing a tetracarboxylic acid component and a diamine component in an organic polar solvent in a predetermined composition ratio, which is then polymerized and imidized at an elevated temperature of about 100 to 250° C., preferably about 130 to 200° C. In imidizing by heating, the reaction is suitably conducted while water or an alcohol eliminated is removed. An amount of the tetracarboxylic acid component and the diamine component to the organic polar solvent is suitably made in such a manner that a concentration of the polyimide in the solvent is about 5 to 50% by weight, preferably 5 to 40% by weight.

The aromatic polyimide solution prepared after the polymerization and the imidization can be directly used in spinning. Alternatively, for example, the aromatic polyimide solution obtained is added to a solvent in which the aromatic polyimide is insoluble, to precipitate and isolate the aromatic polyimide, which is then dissolved in an organic polar solvent so as to a give predetermined concentration to prepare an aromatic polyimide solution, which can be used in spinning.

In the aromatic polyimide solution used in the spinning, a concentration of the polyimide is preferably 5 to 40% by weight, further preferably 8 to 25% by weight, and a solution viscosity (rotational viscosity) is 100 to 15000 poise, preferably 200 to 10000 poise, particularly preferably 300 to 5000 poise at 100° C. If a solution viscosity is less than 100 poise, a uniform membrane (film) may be obtained, but an asymmetric membrane with a large mechanical strength cannot be obtained. If it is more than 15000 poise, extrusion from a spinning nozzle becomes difficult, so that an asymmetric hollow fiber membrane having a desired shape cannot be obtained.

While there are no particular restrictions to the organic polar solvent as long as it can suitably dissolve an aromatic polyimide obtained, examples of such a solvent include phenols such as phenol, cresol and xylenol; catechols such as catechol and resorcin in which a benzene ring directly has two hydroxyl groups; phenolic solvents including halogenated phenols such as 3-chlorophenol, 4-chlorophenol (equivalent to parachlorophenol described later), 3-bromophenol, 4-bromophenol and 2-chloro-5-hydroxytoluene; or amides such as N-methyl-2-pyrrolidone, 1,3-dimethyl-2-imidazolidinone, N,N-dimethylformamide, N,N-diethylformamide, N,N-dimethylacetamide and N,N-diethylacetamide; or mixtures of these. In the present invention, an amide solvent is particularly preferable.

In particular, a polymerization degree in a polyimide for the gas separation membrane of the present invention can be easily increased by polymerization and imidization in an amide solvent.

The polyimide asymmetric gas separation membrane of this invention can be suitably obtained by spinning in a dry-wet method (dry-wet spinning method) using the above aromatic polyimide solution. The dry-wet method is a method where a solvent on the surface of the polymer solution having a hollow fiber shape is evaporated to form a thin dense layer (i.e. separation layer) and immersing the layer into a coagulation liquid (i.e. a solvent compatible with the solvent in the polymer solution and incapable of dissolving the polymer) to cause phase separation which is then utilized to form pores, giving a porous layer (i.e. supporting layer) (a phase inversion process), which has been proposed by Loe et al. (for example, U.S. Pat. No. 3,133,132).

A dry-wet spinning method is a method for forming a hollow fiber membrane using a spinning nozzle in a dry-wet method, which is described in, for example, Patent Documents No. 1 and 3.

That is, any type of spinning nozzle extruding an aromatic polyimide solution as a hollow fiber can be used, and suitable examples include a tube-in-orifice type nozzle. A temperature range of the aromatic polyimide solution during extrusion is generally from about 20 to 150° C., particularly suitably 30 to 120° C. Spinning is conducted while a gas or liquid is fed to the inside of the hollow fiber extruded from the nozzle.

Preferably, the coagulation liquid is substantially incapable of dissolving an aromatic polyimide component and is compatible with a solvent in an aromatic polyimide solution. Suitable examples include, but not limited to, water; lower alcohols such as methanol, ethanol and propyl alcohol; ketones having a lower alkyl group such as acetone, diethyl ketone and methyl ethyl ketone; and mixtures thereof. When a solvent in an aromatic polyimide solution is an amide solvent, an aqueous solution of the amide solvent is also preferable. Thus, preferable examples of the coagulation liquid used in the present invention include water, ethanol, an aqueous solution of ethanol and an aqueous solution of an amide solvent. Particularly preferred are water, an aqueous solution of ethanol and an aqueous solution of an amide solvent.

In the coagulation process, it is preferable to immerse an aromatic polyimide solution extruded from a nozzle as a hollow fiber in a first coagulation liquid in which the aromatic polyimide solution is coagulated such that it can retain its shape, and then to immerse the fiber in a second coagulation liquid for completing coagulation. The first and the second coagulation liquids can be the same as or different from each other.

After replacing the coagulation liquid with a solvent such as a hydrocarbon, the coagulated hollow fiber separation membrane is dried and then suitably further heated. The heating is preferably conducted at a temperature lower than a softening point or second-order transition point.

For an aromatic polyimide used for forming an asymmetric gas separation membrane in the prior art, there has been a problem that an asymmetric membrane obtained from a solution of a polyimide in an amide solvent by dry-wet spinning method does not exhibit satisfactory gas separation performance. However, an aromatic polyimide constituting an asymmetric gas separation membrane of the present invention, even the membrane obtained from a polyimide solution containing an amide solvent as an organic polar solvent by dry-wet spinning method using water or an aqueous solvent as a coagulation liquid, exhibits excellent gas separation performance and improved mechanical properties. An aqueous solvent in the present invention means an aqueous solution of an organic solvent containing 40% by weight or more, preferably 50% by weight or more, further preferably 60% by weight or more of water.

In addition, when a phenolic solvent (for example, parachlorophenol) is used as an organic polar solvent, an organic solvent must be used in a high concentration because a phenolic solvent is incompatible with an aqueous solvent so that the aqueous solvent cannot be used as a coagulation liquid.

That is, when an amide solvent as an organic polar solvent is used, a manufacturing process using water or an aqueous solvent as a coagulation liquid in a dry-wet method can be conducted, thereby a more convenient facility involved in the process can be employed, compared to the process using an organic solvent in a higher concentration in a coagulation bath. Specifically, by the use of an aqueous liquid in a coagulation bath, facilities required for security such as explosion protection can be simplified. Furthermore, by using an aqueous coagulation bath, emission of volatile organic compounds (VOC) can be reduced.

An asymmetric gas separation membrane of the present invention is a gas separation membrane having an asymmetric structure consisting of an extremely thin dense layer (preferably having a thickness of 0.001 to 5 µm) which is mainly responsible for gas separation performance and a relatively thicker porous layer (preferably having a thickness of 10 to 2000 µm) supporting the dense layer, exhibiting improved excellent gas separation performance. Preferably, it is a hollow fiber membrane having an inner diameter of about 10 to 3000 µm and an outer diameter of about 30 to 7000 µm. Specifically, in the asymmetric gas separation membrane of the present invention, an oxygen gas permeation rate ($P'_{O_2}$) at 50° C. is suitably $6.0 \times 10^{-5}$ cm$^3$(STP)/cm$^2$·sec·cm Hg or more, preferably $7.5 \times 10^{-5}$ cm$^3$(STP)/cm$^2$·sec·cm Hg or more while a ratio of an oxygen gas permeation rate to a nitrogen gas permeation rate ($P'_{O2}/P'_{N2}$) is 3.5 or more, preferably 4.0 or more, more preferably 4.5 or more. In general, such a ratio of a permeation rate is higher at a lower temperature. Furthermore, it has mechanical properties including a tensile strength at break as a hollow fiber membrane of 2.5 kgf/mm$^2$ or more, preferably 3 kgf/mm$^2$ or more, more preferably 4 kgf/mm$^2$ or more, and particularly, an elongation at break as a hollow fiber membrane of 10% or more, preferably 15% or more.

The asymmetric gas separation membrane of the present invention can be suitably used in a membrane module. For example, a conventional gas separation membrane module is fabricated as follows: approximately 100 to 1,000,000 tubes of hollow-fiber membranes having an appropriate length are bound together; the both ends of the hollow-fiber bundle is fixed into a tube sheet made of a thermosetting resin and the like while at least one end of the hollow fiber is kept to be open; and then a resulting hollow-fiber membrane element comprising the hollow-fiber bundle and tube sheet is accommodated in a vessel that is equipped with at least a mixed gas inlet, a permeated gas outlet, and a non-permeated gas outlet, in such a manner that the space connected to the internal side of the hollow-fiber membranes is isolated from the space connected to the external side of the hollow-fiber membranes. In this gas separation membrane module, a mixed gas is fed from the mixed gas inlet to the inside of the hollow-fiber membranes or the space communicating to the outside; a specific gas component contained in the mixed gas is selectively permeated through the membrane while the mixed gas flows in contact with the hollow-fiber membranes; the permeated gas is discharged from the permeated gas outlet and the non-permeated gas that does not permeate through the membranes is discharged from the non-permeated gas outlet. In this way, gas separation is performed.

An asymmetric gas separation membrane of the present invention can separate and recover a variety of gas species with a high permselectivity (permeation-rate ratio). A higher permselectivity is suitable because it leads to a higher recovery rate of a desired gas. There are no particular restrictions to separable gas species. The membrane can be suitably used for separation and recovery of, for example, hydrogen gas, helium gas, carbon dioxide gas, hydrocarbon gases such as methane and ethane, oxygen gas and nitrogen gas. In particular, the membrane can be suitably used for obtaining a nitrogen-rich air which is enriched with nitrogen or an oxygen-rich air which is enriched with oxygen from the air.

EXAMPLES

There will be described the present invention with reference to Examples. The present invention is, however, not limited to the examples below.

Measuring Method for Gas Permeation Performance of a Hollow Fiber Membrane

Six asymmetric hollow fiber membranes, a stainless pipe and an epoxy resin adhesive were used to fabricate an element with an effective length of 8 cm for evaluating permeation performance, which was housed in a stainless vessel to give a pencil module. While a standard mixed gas of helium, oxygen and nitrogen (volume ratio=30:30:40) at a pressure of 1 MPaG and a temperature of 50° C. was fed to the outside of the hollow fiber membrane, a permeate flow rate and a permeated gas composition were measured. The gas composition was determined by gas chromatography. Permeation rates of helium, oxygen and nitrogen gases were calculated from a flow volume of permeation, a permeated gas composition, a feeding pressure and an effective membrane area thus measured.

Measuring Method for Single Gas Permeation Performance

An element for the permeation performance evaluation having an effective length of 8 cm was fabricated by using 15 tubes of asymmetric hollow-fiber membranes, a stainless-steel pipe, and an epoxy resin adhesive, which was housed in a stainless-steel vessel to give a pencil module. To the pensile module, a gas to be tested for permeation was supplied at a temperature of 80° C. and at a pressure of 1 MPaG to the external hollow fiber membranes so as to measure a flow volume of the permeation. A permeation rate of the gas was calculated from a flow volume of permeation gas, a pressure of supply side, a pressure of permeated side and an effective membrane area thus measured.

Measurement for Tensile Strength and Tensile Elongation at Break of Hollow-Fiber Membranes The tensile strength and tensile elongation at break were measured at an effective length of 20 mm and a elongation speed of 10 mm/min with a tensile testing machine. The measurement was performed at 23° C. The cross-sectional area of the hollow fibers was obtained by observing the cross-section of the hollow-fiber with an optical microscope and the dimension was measured from optical microscope image.

Measuring Method for a Solution Viscosity

A solution viscosity of a polyimide solution was measured at 100° C. by a rotating viscometer (a shear rate of a rotor: 1.75 sec$^{-1}$).

Compounds used in the examples below are as follows.

Tetracarboxylic Acid Compounds

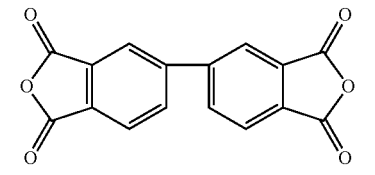

BPDA (B2)
3,3',4,4'-biphenyltetracarboxylic acid dianhydride

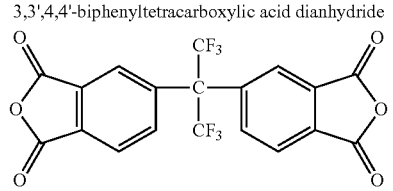

6FDA (B1)
4,4'-(hexafluoroisopropylidene)-bis(phthalic anhydride)

Diamine Compounds Having a Hexafluorinated Structure

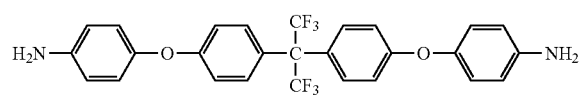

HFBAPP (A1a) 2,2-bis[4-(4-aminophenoxy)phenyl]hexafluoropropane

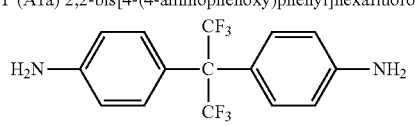

HFIP (A1a) 2,2-bis(4-aminophenyl)hexafluoropropane

-continued

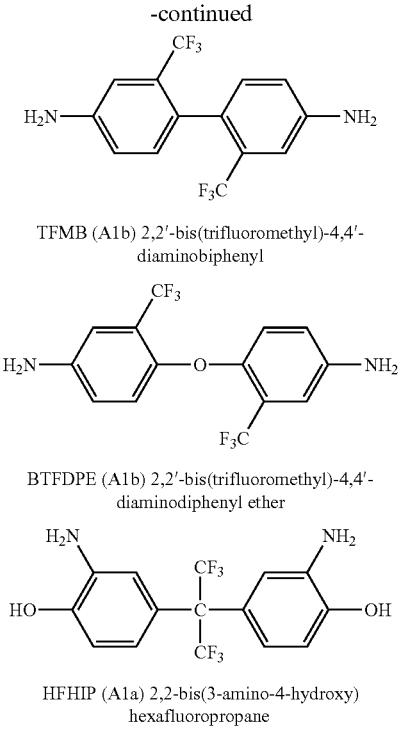

TFMB (A1b) 2,2'-bis(trifluoromethyl)-4,4'-diaminobiphenyl

BTFDPE (A1b) 2,2'-bis(trifluoromethyl)-4,4'-diaminodiphenyl ether

HFHIP (A1a) 2,2-bis(3-amino-4-hydroxy)hexafluoropropane

Diamine Compounds Having a Sulfur-Containing Heterocyclic Structure

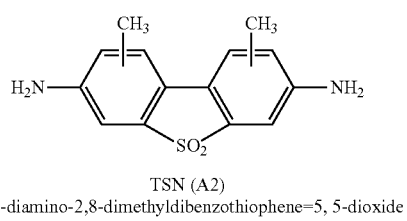

TSN (A2)
3, 7-diamino-2,8-dimethyldibenzothiophene=5, 5-dioxide

Other Diamine Compounds

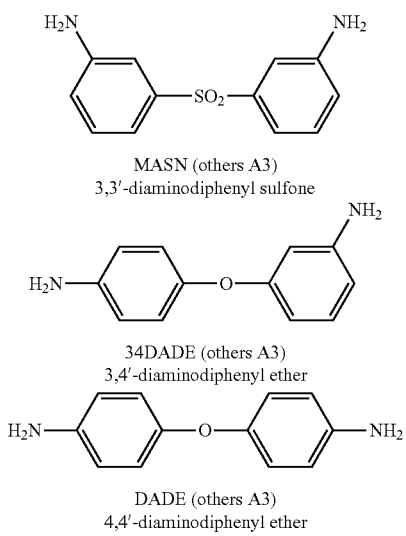

MASN (others A3)
3,3'-diaminodiphenyl sulfone

34DADE (others A3)
3,4'-diaminodiphenyl ether

DADE (others A3)
4,4'-diaminodiphenyl ether

-continued

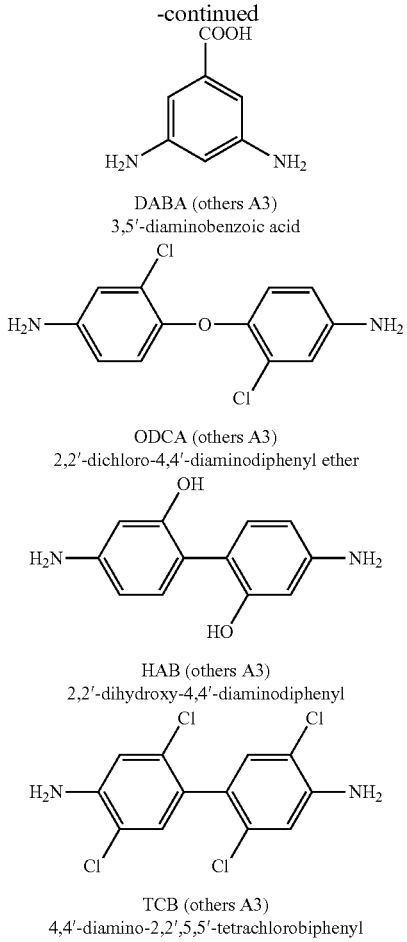

DABA (others A3)
3,5'-diaminobenzoic acid

ODCA (others A3)
2,2'-dichloro-4,4'-diaminodiphenyl ether

HAB (others A3)
2,2'-dihydroxy-4,4'-diaminodiphenyl

TCB (others A3)
4,4'-diamino-2,2',5,5'-tetrachlorobiphenyl

Here, 6FDA can be also called 2,2-bis(3,4-dicarboxyphenyl)hexafluoropropane dianhydride. TSN is a mixture of 3,7-diamino-2,8-dimethyldibenzothiophene=5,5-dioxide as a main ingredient and isomers different in a position of methyl, that is, 3,7-diamino-2,6-dimethyldibenzothiophene=5,5-dioxide and 3,7-diamino-4,6-dimethyldibenzothiophene=5,5-dioxide.

PCP: para-chlorophenol
NMP: N-methyl-2-pyrrolidone

Example 1

In a separable flask equipped with a stirrer and a nitrogen-gas inlet tube, 40 mmol of 6FDA, 60 mmol of BPDA, 20 mmol of HFBAPP, 40 mmol of TSN and 40 mmol of DADE were added with NMP as a solvent such that a polymer concentration was to be 22% by weight. Then, while nitrogen gas was passed through the flask, the mixture was polymerized and imidized with stirring at a reaction temperature of 190° C. for 14 hours, to prepare an aromatic polyimide solution with a polyimide concentration of 22% by weight. This aromatic polyimide solution had a solution viscosity of 554 poise at 100° C.

The aromatic polyimide solution prepared above was filtered through a 400 mesh woven metal. Using a spinning apparatus equipped with a hollow-fiber spinning nozzle, the solution thus obtained as a dope solution was extruded from a circular aperture of the hollow-fiber spinning nozzle (an outer diameter of the circular aperture: 1000 μm, a slit width of the circular aperture: 200 μm, and an outer diameter of a core aperture: 400 μm) while nitrogen gas was discharged from the core aperture to form a hollow fiber. The hollow fiber was passed through a nitrogen atmosphere and then immersed in a first coagulation liquid (30° C., a 20% by weight of aqueous solution of NMP). Next, the fiber was moved back and forth between guide rolls in a second coagulation liquid (30° C., a 20% by weight of aqueous solution of NMP) in a second coagulation apparatus equipped with a pair of guide rolls to coagulate the hollow fiber state. Then, the fiber was wound by a winding-up roll at a winding rate of 10 m/min to provide a wet hollow fiber membrane. Subsequently, this hollow fiber membrane was treated with water for removing the solvent, and then water was replaced with ethanol and ethanol was replaced with isooctane. Then, the membrane was heated at 100° C. for evaporating isooctane and further heated at 200° C. for 30 min to provide a hollow fiber membrane.

All of the hollow fiber membranes thus prepared generally had an outer diameter of 400 μm and an inner diameter of 200 μm. From the hollow fiber membrane, a fiber-bundle element was formed. Subsequently, a gas separation membrane module was formed from the fiber-bundle element with the hollow fiber membrane.

The hollow fiber membrane was measured for gas permeation performance and mechanical properties as described above. The results are shown in Table 2.

Example 5

In a separable flask equipped with a stirrer and a nitrogen-gas inlet, tube 40 mmol of BPDA, 60 mmol of 6FDA, 70 mmol of TSN and 30 mmol of HFBAPP were added with PCP as a solvent such that a polymer concentration was to be 17% by weight. Then, while nitrogen gas was passed through the flask, the mixture was polymerized and imidized with stirring at a reaction temperature of 190° C. for 14 hours, to prepare an aromatic polyimide solution with a polyimide concentration of 17% by weight. This aromatic polyimide solution had a solution viscosity of 1376 poise at 100° C.

The aromatic polyimide solution prepared above was filtered through a 400 mesh woven metal. Using a spinning apparatus equipped with a hollow-fiber spinning nozzle, the solution thus obtained as a dopant solution was extruded from a circular aperture in the hollow-fiber spinning nozzle (an outer diameter of the circular aperture: 1000 μm, a slit width of the circular aperture: 200 μm, and an outer diameter of a core aperture: 400 μm) while nitrogen gas was discharged from the core aperture to form a hollow fiber. The hollow fiber was passed through a nitrogen atmosphere and then immersed in a first coagulation liquid (0° C., a 75% by weight of aqueous solution of ethanol). Next, the fiber was moved back and forth between guide rolls in a second coagulation liquid (0° C., a 75% by weight of aqueous solution of ethanol) in a second coagulation apparatus equipped with a pair of guide rolls to coagulate the hollow fiber state. Then, the fiber was wound by a winding-up roll at a winding rate of 10 m/min to provide a wet hollow fiber membrane. Subsequently, this hollow fiber membrane was treated with ethanol for removing the solvent, and then ethanol was replaced with isooctane. Then, the membrane was heated at 100° C. for evaporating isooctane and further heated at 250° C. for 30 min to provide a hollow fiber membrane.

All of the hollow fiber membranes thus prepared generally had an outer diameter of 400 μm and an inner diameter of 200 μm. From the hollow fiber membrane, a fiber-bundle element was formed. Subsequently, a gas separation membrane module was formed from the fiber-bundle element with the hollow fiber membrane. The hollow fiber membrane was measured for gas permeation performance and mechanical properties as described above. The results are shown in Table 2.

Examples 2 to 4 and 6 to 22

A solution of each aromatic polyimide was prepared as described in Example 1, except that a tetracarboxylic acid component and a diamine component whose types and composition are shown in Table 1 were used and a solvent shown in Table 1 was used in such a manner that a concentration shown in Table 1 was obtained. Then, from each aromatic polyimide solution, a hollow fiber membrane was prepared using a coagulation liquid shown in Table 1 and conducting the final heating process at a temperature shown in Table 1. Then, from the hollow fiber membrane, a fiber-bundle element was formed. Subsequently, a gas separation membrane module was formed from the fiber-bundle element with the hollow fiber membrane. Here, in Example 18 using PCP as a solvent, a hollow fiber membrane was prepared as described in Example 5, a fiber-bundle element was formed from the hollow fiber membrane, and then a gas separation membrane module was formed from the fiber-bundle element with the hollow fiber membrane.

The hollow fiber membranes thus obtained were measured for their gas permeation performance and mechanical properties as described above. The results are shown in Table 2.

For Examples 2, 15 and 17, single-gas separation performance was measured for hydrogen, carbon dioxide and methane gases as described above. The results are shown in Table 3.

Comparative Examples 1 to 8

A solution of each aromatic polyimide was prepared as described in Example 1 or 5, except that a tetracarboxylic acid component and a diamine component whose types and composition are shown in Table 1 were used and a solvent shown in Table 1 was used in such a manner that a concentration shown in Table 1 was obtained. Then, a hollow fiber membrane was prepared from each aromatic polyimide solution under the conditions shown in Table 1 as described in Example 1 and 5 when NMP and PCP was used as a solvent, respectively, and then a fiber-bundle element was formed from the hollow fiber membrane. Subsequently, a gas separation membrane module was formed from the fiber-bundle element from each hollow fiber membrane. The hollow fiber membranes thus prepared were measured for gas permeation performance and mechanical properties as described above. The results are shown in Table 2.

Comparative Example 9

In a separable flask equipped with a stirrer and a nitrogen-gas inlet tube 50 mmol of 6FDA, 50 mmol of BPDA, 50 mmol of TSN and 50 mmol of TCB were added with NMP as a solvent in such a manner that a polymer concentration was to be 21.5% by weight. Then, while nitrogen gas was passed through the flask, the mixture was polymerized and imidized with stirring at a reaction temperature of 190° C. for 50 hours, to prepare an aromatic polyimide solution with a polyimide concentration of 21.5% by weight. However, this aromatic polyimide was poorly polymerized and a solution viscosity of the aromatic polyimide solution at 100° C. was as small as 37 poise, and thus, the solution failed to give a hollow fiber membrane.

TABLE 1

| | Separation membrane composition (mol fraction (%)) | | | | | | | | | | | |
|---|---|---|---|---|---|---|---|---|---|---|---|---|
| | Tetra-carboxylic acid component | | Diamine component | | | | | | | | | |
| | | | A1 | | | | | A2 | Others | | | |
| | | | | | | | | | | | 3,4' | |
| | 6FDA | BPDA | HFBAPP | HFIP | HFHIP | BTFDPE | TFMB | TSN | MASN | DADE | DADE | DABA |
| Example 1 | 40 | 60 | 20 | | | | | 40 | 40 | | | |
| Example 2 | 40 | 60 | 40 | | | | | 60 | | | | |
| Example 3 | 30 | 70 | 20 | | | | | 60 | 20 | | | |
| Example 4 | 30 | 70 | 40 | | | | | 60 | | | | |
| Example 5 | 60 | 40 | 30 | | | | | 70 | | | | |
| Example 6 | 40 | 60 | | 30 | | | | 70 | | | | |
| Example 7 | 40 | 60 | 20 | | | | | 70 | 10 | | | |
| Example 8 | 40 | 60 | 20 | | | | | 70 | | | | 10 |
| Example 9 | 40 | 60 | 20 | | | | | 70 | | | | |
| Example 10 | 40 | 60 | 20 | | | | | 70 | | 10 | | |
| Example 11 | 40 | 60 | 20 | | | | | 70 | | | 10 | |
| Example 12 | 40 | 60 | 20 | | | | | 70 | | | | |
| Example 13 | 40 | 60 | | | | | 20 | 70 | 10 | | | |
| Example 14 | 40 | 60 | 15 | | | | | 70 | 15 | | | |
| Example 15 | 40 | 60 | 30 | | | | | 70 | | | | |
| Example 16 | 40 | 60 | 20 | | | | | 70 | 10 | | | |
| Example 17 | 40 | 60 | 15 | | | | | 70 | 15 | | | |
| Example 18 | 15 | 85 | 30 | | | | | 70 | | | | |
| Example 19 | 50 | 50 | | | | | 20 | 80 | | | | |
| Example 20 | 40 | 60 | 20 | | | | | 80 | | | | |
| Example 21 | 40 | 60 | | | 30 | | | 70 | | | | |
| Example 22 | 40 | 60 | | | | 30 | | 70 | | | | |
| Comparative Example 1 | 40 | 60 | 30 | 70 | | | | | | | | |
| Comparative Example 2 | 40 | 60 | 30 | | | 70 | | | | | | |
| Comparative Example 3 | 40 | 60 | 60 | | | | | 40 | | | | |
| Comparative Example 4 | 40 | 60 | 0 | | | | | 50 | | | | |
| Comparative Example 5 | 80 | 20 | 30 | | | | | 70 | | | | |
| Comparative Example 6 | 40 | 60 | 0 | | | | | 70 | 30 | | | |
| Comparative Example 7 | 0 | 100 | 10 | | | | | 90 | | | | |
| Comparative Example 8 | 40 | 60 | 0 | | | | | 100 | | | | |
| Comparative Example 9 | 50 | 50 | | | | | | 50 | | | | |

| | Separation membrane composition (mol fraction (%)) Diamine component Others | | | Solvent | Concentration wt % | Polymerization time hr | Solution viscosity poise | Coagulation liquid | Heating Temperature ° C. |
|---|---|---|---|---|---|---|---|---|---|
| | ODCA | HAB | TCB | | | | | | |
| Example 1 | | | | NMP | 22 | 26 | 554 | 20 wt % NMP | 200 |
| Example 2 | | | | NMP | 23 | 26 | 449 | Water | 250 |
| Example 3 | | | | NMP | 23 | 21.5 | 822 | Water | 200 |
| Example 4 | | | | NMP | 23 | 25 | 678 | Water | 200 |
| Example 5 | | | | PCP | 17 | 14 | 1376 | 75 wt % EtOH | 250 |
| Example 6 | | | | NMP | 21.5 | 20 | 897 | 30 wt % EtOH | 230 |
| Example 7 | | | | NMP | 23 | 18 | 790 | 10 wt % NMP | 200 |
| Example 8 | | | | NMP | 23 | 10 | 2289 | 10 wt % NMP | 250 |
| Example 9 | 10 | | | NMP | 23 | 16.5 | 1455 | Water | 150 |
| Example 10 | | | | NMP | 23 | 15 | 1867 | 30 wt % NMP | 250 |
| Example 11 | | | | NMP | 23 | 12.5 | 1639 | 30 wt % NMP | 230 |
| Example 12 | | | 10 | NMP | 23 | 14.5 | 910 | 20 wt % NMP | 150 |

TABLE 1-continued

| | | | | | | | |
|---|---|---|---|---|---|---|---|
| Example 13 | | | NMP | 23 | 26 | 1294 | 30 wt % NMP | 200 |
| Example 14 | | | NMP | 23 | 26.5 | 2256 | Water | 200 |
| Example 15 | | | NMP | 23 | 25 | 637 | 30 wt % EtOH | 250 |
| Example 16 | | | NMP | 23 | 18 | 3998 | Water | 200 |
| Example 17 | | | NMP | 23 | 26.5 | 2256 | Water | 250 |
| Example 18 | | | PCP | 17 | 8.5 | 1339 | 75 wt % EtOH | 230 |
| Example 19 | | | NMP | 21.5 | 15.5 | 1171 | 30 wt % NMP | 230 |
| Example 20 | | | NMP | 23 | 17 | 2392 | 30 wt % EtOH | 250 |
| Example 21 | | | NMP | 21.5 | 14.5 | 559 | 30 wt % EtOH | 230 |
| Example 22 | | | NMP | 21.5 | 17 | 1493 | 30 wt % EtOH | 150 |
| Comparative Example 1 | | | NMP | 25 | 29.5 | 1656 | Water | 250 |
| Comparative Example 2 | | | NMP | 25 | 19.5 | 1815 | Water | 250 |
| Comparative Example 3 | | | PCP | 17 | 34 | 1358 | 75 wt % EtOH | 300 |
| Comparative Example 4 | | 50 | PCP | 17 | 29 | 1209 | 75 wt % EtOH | 250 |
| Comparative Example 5 | | | PCP | 17 | 22 | 1488 | 75 wt % EtOH | 330 |
| Comparative Example 6 | | | NMP | 23 | 17 | 1004 | 45 wt % EtOH | 250 |
| Comparative Example 7 | | | PCP | 17 | 5.5 | 3,069 | 75 wt % EtOH | 250 |
| Comparative Example 8 | | | PCP | 17 | 16 | 2195 | 75 wt % EtOH | 300 |
| Comparative Example 9 | | 50 | NMP | 21.5 | 50 | 37 | | |

TABLE 2

| | Gas separation performance (Shellfeed, 50° C.) $(10^{-5} \times cm^3(STP)/(cm^2 \cdot s \cdot cmHg))$ | | | | | Tensile elongation at break % Elongation at break | Tensile strength at break $kgf/mm^2$ Stress at break | Elastic modulus $kgf/mm^2$ Young's modulus |
|---|---|---|---|---|---|---|---|---|
| | $P'_{He}$ | $P'_{O2}$ | $P'_{N2}$ | $P'_{He}/P'_{N2}$ | $P'_{O2}/P'_{N2}$ | | | |
| Example 1 | 73.99 | 7.89 | 1.78 | 42 | 4.44 | 25.5 | 3.7 | 78.8 |
| Example 2 | 77.88 | 9.60 | 2.25 | 35 | 4.27 | 23.9 | 4.4 | 97.0 |
| Example 3 | 70.91 | 7.81 | 1.81 | 39 | 4.30 | 13.9 | 4.3 | 103.9 |
| Example 4 | 70.42 | 9.74 | 2.42 | 29 | 4.03 | 25.5 | 4.5 | 90.9 |
| Example 5 | 87.18 | 10.41 | 2.48 | 35 | 4.19 | 11.6 | 2.6 | 62.7 |
| Example 6 | 69.69 | 9.23 | 2.22 | 31 | 4.16 | 12.9 | 4.3 | 98.4 |
| Example 7 | 77.88 | 9.43 | 2.24 | 35 | 4.21 | 17.2 | 4.8 | 112.9 |
| Example 8 | 66.98 | 7.97 | 1.83 | 37 | 4.36 | 24.2 | 5.0 | 112.4 |
| Example 9 | 53.31 | 7.10 | 1.71 | 31 | 4.15 | 32.3 | 5.4 | 110.4 |
| Example 10 | 53.49 | 7.09 | 1.62 | 33 | 4.39 | 27.0 | 5.2 | 111.2 |
| Example 11 | 59.31 | 7.01 | 1.55 | 38 | 4.54 | 31.2 | 5.6 | 129.2 |
| Example 12 | 55.49 | 7.67 | 1.86 | 30 | 4.12 | 16.2 | 4.9 | 116.5 |
| Example 13 | 62.61 | 7.95 | 1.85 | 34 | 4.29 | 13.6 | 4.3 | 103.4 |
| Example 14 | 64.59 | 7.88 | 1.73 | 37 | 4.55 | 13.5 | 4.4 | 98.6 |
| Example 15 | 68.59 | 7.61 | 1.68 | 41 | 4.53 | 12.7 | 4.0 | 97.2 |
| Example 16 | 72.18 | 8.60 | 2.09 | 35 | 4.11 | 17.4 | 4.6 | 109.8 |
| Example 17 | 70.61 | 7.81 | 1.69 | 42 | 4.61 | 14.1 | 4.6 | 100.8 |
| Example 18 | 65.60 | 8.97 | 2.11 | 31 | 4.25 | 11.0 | 3.3 | 83.8 |
| Example 19 | 52.88 | 7.11 | 1.68 | 31 | 4.23 | 16.1 | 4.5 | 105.7 |
| Example 20 | 61.33 | 8.10 | 1.91 | 32 | 4.23 | 27.5 | 5.9 | 129.7 |
| Example 21 | 46.34 | 7.25 | 1.89 | 25 | 3.83 | 29.8 | 5.6 | 135.3 |
| Example 22 | 44.46 | 7.70 | 2.10 | 21 | 3.66 | 22.0 | 5.9 | 119.7 |
| Comparative Example 1 | 69.97 | 9.99 | 3.12 | 22 | 3.20 | 23.2 | 2.7 | 64.1 |
| Comparative Example 2 | 17.10 | 1.21 | 0.24 | 71 | 5.02 | 68.2 | 6.0 | 119.0 |
| Comparative Example 3 | 59.55 | 6.29 | 2.15 | 28 | 2.93 | 14.5 | 1.6 | 37.2 |
| Comparative Example 4 | 37.00 | 5.10 | 0.88 | 42 | 5.78 | 6.0 | 3.5 | 121.0 |

TABLE 2-continued

| | Gas separation performance (Shellfeed, 50° C.) | | | | | Tensile elongation at break | Tensile strength at break | Elastic modulus |
|---|---|---|---|---|---|---|---|---|
| | $(10^{-5} \times cm^3(STP)/(cm^2 \cdot s \cdot cmHg))$ | | | | | % Elongation at break | $kgf/mm^2$ Stress at break | $kgf/mm^2$ Young's modulus |
| | $P'_{He}$ | $P'_{O2}$ | $P'_{N2}$ | $P'_{He}/P'_{N2}$ | $P'_{O2}/P'_{N2}$ | | | |
| Comparative Example 5 | 120.55 | 16.88 | 4.75 | 25 | 3.55 | 10.1 | 1.8 | 44.3 |
| Comparative Example 6 | 27.67 | 5.53 | 1.32 | 21 | 4.19 | 9.9 | 3.2 | 78.0 |
| Comparative Example 7 | 5.61 | 0.53 | 0.13 | 42 | 3.98 | 61.1 | 8.7 | 106.5 |
| Comparative Example 8 | 27.30 | 2.20 | 0.37 | 73 | 5.90 | 32.7 | 7.7 | 136.4 |

TABLE 3

| | Single gas separation performance (Shellfeed, 80° C.) | | | | |
|---|---|---|---|---|---|
| | $P'_{H2}$ | $P'_{CO2}$ | $P'_{CH4}$ | $P'_{H2}/P'_{CH4}$ | $P'_{CO2}/P'_{CH4}$ |
| | $10^{-5} \times cm^3(STP)/(cm^2 \cdot s \cdot cmHg)$ | | | | |
| Example 2 | 115.0 | 41.1 | 2.46 | 46.7 | 16.7 |
| Example 15 | 89.7 | 27.3 | 1.36 | 66.0 | 20.1 |
| Example 17 | 108.1 | 31.9 | 1.99 | 54.4 | 16.0 |

From the above results, it is clearly understood that Examples according to the present invention meet all performance requirements while Comparative Examples are inferior to Examples in the following respects.

Comparative Example 1 without unit A2 exhibits inferior separation performance, that is, has a reduced ratio of an oxygen gas permeation rate to a nitrogen gas permeation rate ($P'_{O2}/P'_{N2}$).

Comparative Example 2 similarly without unit A2 has a reduced oxygen gas permeation rate ($P'_{O2}$), and thus cannot be used in practical separation.

Comparative Example 3 containing unit A1 in an excessive amount over a defined range exhibits inferior separation performance ($P'_{O2}/P'_{N2}$) and has an inadequate tensile strength at break to be practically used.

Comparative Example 4 without unit A1 exhibits inferior oxygen gas permeation rate ($P'_{O2}$) and has an inadequate elongation at break to be practically used.

Comparative Example 5 containing units B1 and B2 in amounts beyond a defined range exhibits inferior separation performance ($P'_{O2}/P'_{N2}$) and has an inadequate tensile strength at break to be practically used.

Comparative Example 6 without unit A1 has a reduced oxygen gas permeation rate ($P'_{O2}$) and particularly an inadequate tensile elongation at break to be practically used.

Comparative Example 7 without unit B1 has a considerably reduced oxygen gas permeation rate ($P'_{O2}$) and exhibits inadequate separation performance ($P'_{O2}/P'_{N2}$).

Comparative Example 8 without unit A1 has a considerably reduced oxygen gas permeation rate ($P'_{O2}$).

Comparative Example 9 without unit A1 exhibits considerably reduced polymerization degree in an amide solvent.

In addition, Examples according to the present invention exhibits adequate performance when an amide solvent is used, so that an aqueous solvent can be used as a coagulation bath and a facility required for ensuring safety such as explosion protection can be simplified.

INDUSTRIAL USABILITY

This invention can provide an asymmetric gas separation membrane exhibiting improved gas separation performance, for example excellent gas separation performance between oxygen and nitrogen gases or between helium and nitrogen gases, and maintaining mechanical properties.

This invention can also provide a process for separating gases comprising separating gases by selectively permeating oxygen gas through the above asymmetric gas separation membrane from a mixed gas containing oxygen and nitrogen gases.

The invention claimed is:

1. An asymmetric gas separation membrane made of a soluble aromatic polyimide comprising a repeating unit represented by general formula (I):

general formula (1)

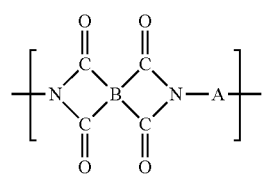

wherein,

B comprises 10 to 70 mol % of a tetravalent unit B1 having a diphenylhexafluoropropane structure represented by general formula (B1), and 90 to 30 mol % of a tetravalent unit B2 having a biphenyl structure represented by general formula (B2); and A comprises 10 to 50 mol % of a bivalent unit A1 having a hexafluorinated structure selected from the group consisting of a unit represented by general formula (A1a) and a unit represented by (A1b), and 90 to 30 mol % of a bivalent unit A2 having a sulfur-containing heterocyclic structure selected from the group consisting of a bivalent unit represented by general formula (A2a) and a bivalent unit represented by general formula (A2b);

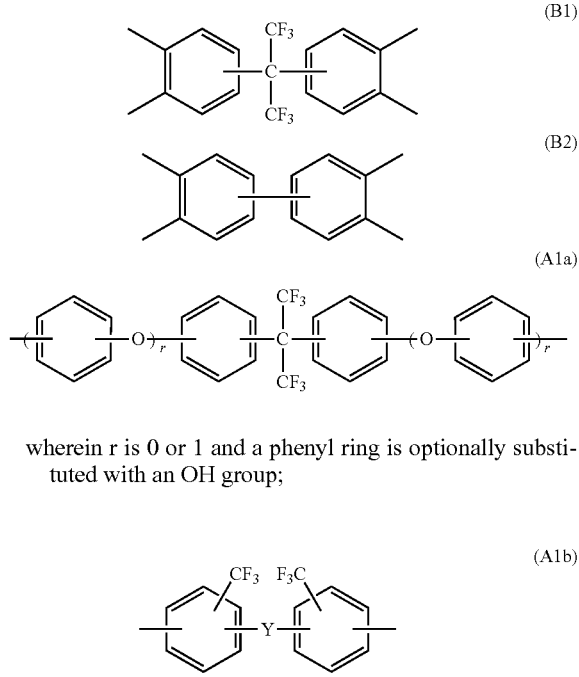

wherein r is 0 or 1 and a phenyl ring is optionally substituted with an OH group;

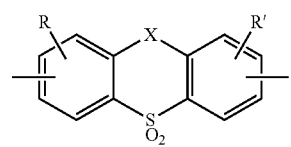

wherein Y represents O or single bond;

(A2a)

wherein R and R' are hydrogen or an organic group and n is 0, 1 or 2;

(A2b)

wherein R and R' are hydrogen or an organic group, and X is —CH$_2$— or —CO—.

2. The asymmetric gas separation membrane according to claim 1, wherein said unit A1 is a bivalent unit derived from a compound selected from the group consisting of 2,2-bis[4-(4-aminophenoxy)phenyl]hexafluoropropane, 2,2-bis(4-aminophenyl)hexafluoropropane, 2,2-bis(3-amino-4-hydroxy)hexafluoropropane, 2,2'-bis(trifluoromethyl)-4,4'-diaminobiphenyl, 2,2'-bis(trifluoromethyl)-4,4'-diaminodiphenyl ether and a combination thereof by removing an amino group.

3. The asymmetric gas separation membrane according to claim 1, wherein said unit A2 is a bivalent unit derived from 3,7-diamino-dimethyldibenzothiophene=5,5-dioxide by removing an amino group.

4. The asymmetric gas separation membrane according to claim 1, wherein said A in general formula (1) comprises a bivalent unit A3 derived from a diamine component other than said unit A1 or A2 in an amount of 50 mol % or less.

5. The asymmetric gas separation membrane according to claim 1, wherein the membrane is a hollow fiber membrane.

6. The asymmetric gas separation membrane according to claim 1, wherein a solvent in an aromatic polyimide solution during membrane formation is an amide solvent.

7. The asymmetric gas separation membrane according to claim 6, wherein a coagulation liquid into which an aromatic polyimide solution is extruded during membrane formation is selected from the group consisting of water, an aqueous solution of an amide solvent and an aqueous solution of ethanol.

8. The asymmetric gas separation membrane according to claim 1, wherein said membrane exhibits gas separation performance in which a permeation rate of an oxygen gas ($P'_{O2}$) is $6.0 \times 10^{-5}$ cm$^3$(STP)/cm$^2 \cdot$sec$\cdot$cm Hg or more and a ratio of a permeation rate of an oxygen gas to that of a nitrogen gas ($P'_{O2}/P'_{N2}$) is 4.0 or more.

9. The asymmetric gas separation membrane according to claim 1, wherein a tensile elongation at break is 10% or more.

10. A process for selectively separating and recovering a particular gas from a mixed gas containing two or more gases, using the asymmetric gas separation membrane according to claim 1.

11. A process for producing an oxygen-rich air or nitrogen-rich air from an air, using the asymmetric gas separation membrane according to claim 1.

* * * * *